United States Patent
Kim et al.

(10) Patent No.: US 10,445,546 B2
(45) Date of Patent: Oct. 15, 2019

(54) AUTHENTICATION METHOD AND AUTHENTICATION APPARATUS USING SYNTHESIZED CODE FOR IRIS

(71) Applicant: SAMSUNG ELECTRONICS CO., LTD., Suwon-si (KR)

(72) Inventors: Jihye Kim, Anyang-si (KR); Sungjoo Suh, Seoul (KR); Hyunjeong Lee, Hwaseong-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 15/673,827

(22) Filed: Aug. 10, 2017

(65) Prior Publication Data

US 2018/0211089 A1     Jul. 26, 2018

(30) Foreign Application Priority Data

Jan. 23, 2017   (KR) .................... 10-2017-0010336

(51) Int. Cl.
   *G06K 9/00*   (2006.01)

(52) U.S. Cl.
   CPC ........ *G06K 9/00013* (2013.01); *G06K 9/0061* (2013.01); *G06K 9/00617* (2013.01); *G06K 9/00926* (2013.01)

(58) Field of Classification Search
   CPC ............. G06K 9/00013; G06K 9/0061; G06K 9/00617; G06K 9/00926
   See application file for complete search history.

(56) References Cited

U.S. PATENT DOCUMENTS

| | | | |
|---|---|---|---|
| 7,486,806 B2 | 2/2009 | Azuma et al. | |
| 9,070,016 B2 | 6/2015 | Su et al. | |
| 2006/0282671 A1 | 12/2006 | Burton | |
| 2011/0075892 A1* | 3/2011 | Connell, II | G06K 9/00617 |
| | | | 382/117 |
| 2012/0328166 A1 | 12/2012 | Connell, II et al. | |
| 2015/0253572 A1 | 9/2015 | Cohen et al. | |
| 2016/0364611 A1* | 12/2016 | Krichen | G06T 7/11 |

FOREIGN PATENT DOCUMENTS

| | | |
|---|---|---|
| JP | 3586456 B2 | 11/2004 |
| KR | 2003-0076479 A | 9/2003 |
| KR | 10-0787114 B1 | 12/2007 |
| KR | 10-0858681 B1 | 9/2008 |
| KR | 10-2010-0083482 A | 7/2010 |
| KR | 10-2016-0018318 A | 2/2016 |
| KR | 10-1622253 B1 | 5/2016 |

* cited by examiner

*Primary Examiner* — Menatoallah Youssef
(74) *Attorney, Agent, or Firm* — NSIP Law (57) ABSTRACT

An authentication method and corresponding apparatus includes obtaining iris images, and constituting an enroll set including iris codes and mask codes corresponding to the iris images. The authentication method and corresponding apparatus also include generating a synthesized code including a synthesized iris code and a synthesized mask code based on correlations between the iris codes included in the enroll set in block units.

19 Claims, 8 Drawing Sheets

AUTHENTICATION METHOD AND AUTHENTICATION APPARATUS USING SYNTHESIZED CODE FOR IRIS

CROSS-REFERENCE TO RELATED APPLICATION(S)

This application claims the benefit under 35 USC § 119(a) of Korean Patent Application No. 10-2017-0010336 filed on Jan. 23, 2017, in the Korean Intellectual Property Office, the entire disclosure of which is incorporated herein by reference for all purposes.

BACKGROUND

1. Field

The following description relates to an authentication method and an authentication apparatus, and more particularly, to an authentication method and an authentication apparatus for an iris.

2. Description of Related Art

Recently, with developments related to various mobile devices such as smartphones and wearable devices, secure authentication is becoming increasingly more important. With biometrics authentication technology, a user may be authenticated based on, for example, a fingerprint, an iris, a voice, a face, and blood vessels. A biometric feature may be used for authentication, because the biometric feature is unique, is robust against forgery or falsification, is convenient and provides minimal variances over a lifetime of the user.

Iris authentication relates to a contactless authentication apparatus and method and is convenient for the user because the user may freely hold a cellular phone in one hand while the cellular phone authenticates the user prior to allowing access to the phone.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an authentication method, including: obtaining iris images; constituting an enroll set including iris codes and mask codes corresponding to the iris images; and generating a synthesized code including a synthesized iris code and a synthesized mask code based on correlations between the iris codes included in the enroll set in block units.

The generating of the synthesized code may also include: calculating the correlations between the iris codes in the block units; and determining, for each block position of the iris codes, the synthesized iris code and the synthesized mask code based on correlations with blocks that respectively correspond to different iris image positions.

The generating of the synthesized code may also include: determining, for each block position of the iris codes, a block having a greatest correlation with the blocks that respectively correspond to the different iris image positions; and for each block position of the iris codes, determining an iris code of the block having the greatest correlation as a synthesized iris code of the corresponding block position, and determining a mask code corresponding to the iris code of the block having the greatest correlation as a synthesized mask code of the corresponding block position.

The generating of the synthesized code may also include: determining, for each block position of the iris codes, a block having a second greatest correlation with the blocks that respectively correspond to different iris image positions; and for each block position of the iris codes, determining an iris code of the block having the second greatest correlation as a synthesized iris code of the corresponding block, and determining a mask code corresponding to the iris code of the block having the second greatest correlation as a synthesized mask code of the corresponding block.

The calculating of the correlations in the block units may include calculating correlations between blocks at respective identical positions of the iris codes.

The calculating of the correlations in the block units may also include: aligning the iris codes and the mask codes included in the enroll set; and dividing the aligned iris codes and the aligned mask codes in the block units.

The block units may be different from each other or partially overlap.

The method may also include: updating the enroll set based on the synthesized code.

The updating of the enroll set may also include: adding the synthesized code to the enroll set; and replacing the synthesized code with any one of the iris codes and the mask codes included in the enroll set.

The method may also include: generating an authentication iris code and an authentication mask code corresponding to an authentication iris image; and authenticating the authentication iris image based on similarities between the authentication iris code and the iris codes included in the enroll set, and similarities between the authentication mask code and the mask codes included in the enroll set.

The method may also include: updating the enroll set by the authentication iris code and the authentication mask code based on the similarities.

The updating may also include: adding the authentication iris code and the authentication mask code to the enroll set; aligning all of the iris codes and all of the mask codes included in the enroll set to which the authentication iris code and the authentication mask code are added; calculating correlations between all of the iris codes in block units; and generating the synthesized code by determining, for each block position of all the iris codes, the synthesized code and the synthesized mask code based on correlations with blocks that respectively correspond to different iris image positions.

The constituting of the enroll set may also include: generating the iris codes and the mask codes corresponding to the iris images using iris images having a measured quality greater than or equal to a threshold; and constituting the enroll set using the iris codes and the mask codes.

The obtaining may also include: obtaining the iris images using a mobile device.

In accordance with an embodiment, there is provided a non-transitory computer-readable storage medium storing instructions that, when executed by a processor, cause the processor to perform the method described above.

In accordance with an embodiment, there is provided an authentication apparatus, including: a sensor configured to photograph iris images; and a processor configured to constitute an enroll set including iris codes and mask codes corresponding to the iris images, and generate a synthesized code including a synthesized iris code and a synthesized mask code based on correlations between the iris codes included in the enroll set in block units.

The processor is configured to calculate the correlations between the iris codes in the block units, and generate the synthesized code by determining, for each block position of the iris codes, the synthesized iris code and the synthesized mask code based on correlations with blocks that respectively correspond to different iris image positions.

The processor may be configured to generate the synthesized code by determining, for each block position of the iris codes, a block having a greatest correlation with the blocks that respectively correspond to the different iris image positions, determining, for each block position of the iris codes, an iris code of the block having the greatest correlation, and determining a mask code corresponding to the iris code of the block having the greatest correlation as a synthesized mask code of the corresponding block position.

The processor may be configured to align the iris codes and the mask codes included in the enroll set, and divide the aligned iris codes and the aligned mask codes in the block units.

The processor may be configured to update the enroll set based on the synthesized code.

The authentication apparatus may also include: a communication interface configured to receive an authentication iris image, wherein the processor is configured to generate an authentication iris code and an authentication mask code corresponding to the authentication iris image, and authenticate the authentication iris image based on similarities between the authentication iris code and the iris codes included in the enroll set, and similarities between the authentication mask code and the mask codes included in the enroll set.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of this application.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Examples to be provided below may be used to recognize an input image including bioinformation, and to additionally constitute and update an enroll set (or enroll database).

The examples may be implemented as various types of products, for example, personal computers, laptop computers, tablet computers, smartphones, televisions, smart home appliances, intelligent vehicles, kiosks, and wearable devices. For example, the examples are applicable to process an image for user authentication by a smartphone, a mobile device, a smart home system, an intelligent vehicle, and an automated teller machine (ATM). Also, the examples are applicable to a payment service and an intelligent vehicle system through user authentication. Hereinafter, reference will now be made in detail to the examples with reference to the accompanying drawings, wherein like reference numerals refer to like elements throughout.

Figure 1:
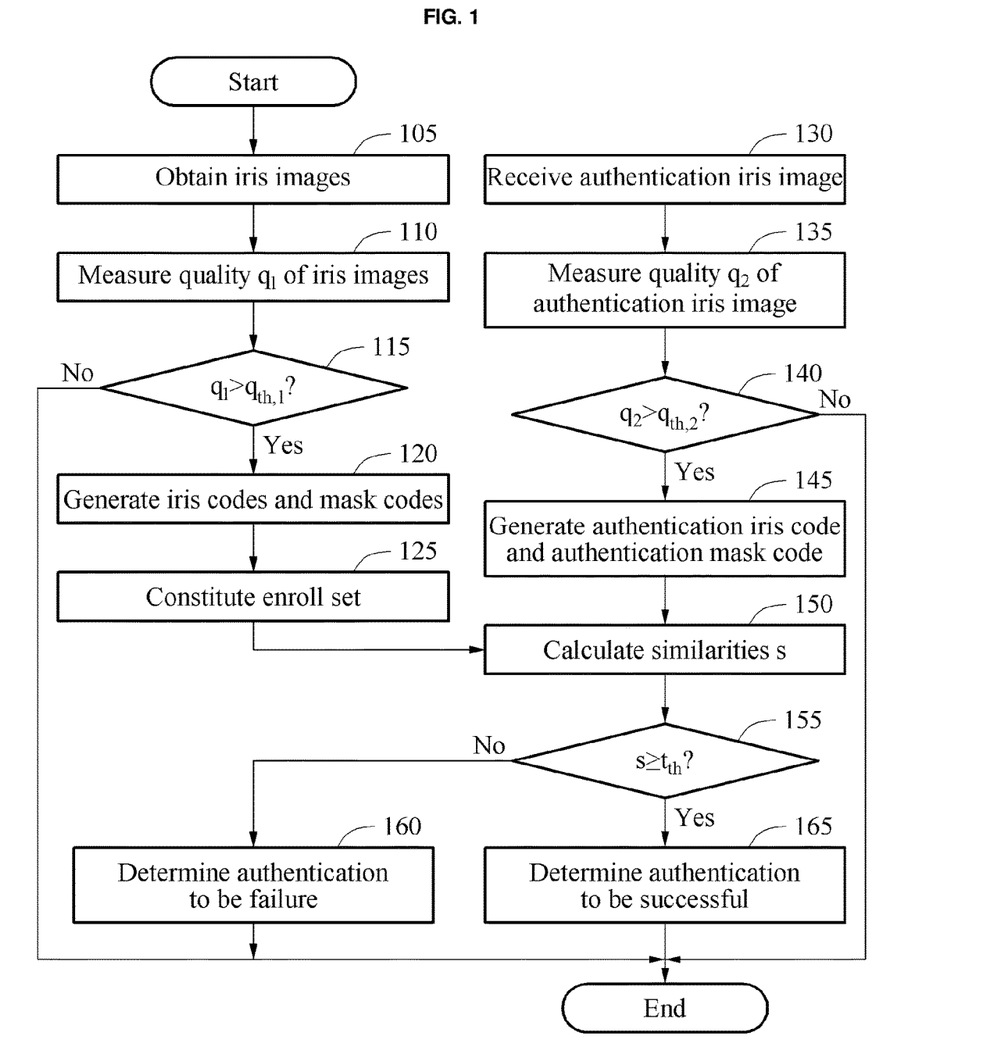
FIG. 1 is a flowchart illustrating an example of a process in which authentication is performed.

FIG. 1 is a flowchart illustrating an example of a process in which authentication is performed. A user enrolls, stores, or registers his/hers own iris image in a device that performs iris recognition. Enrolled or registered iris images are encoded and stored, and used to determine whether to authorize access of the device based on an authenticity verification process, which compares each of the enrolled or registered iris images to a code of an iris image that is input for authentication. A process of operations 105 through 125 to be described below corresponds to a process in which a user encodes own iris images and enrolls or registers the iris images in a device. In addition, a process of operations 130 through 165 corresponds to a process of authenticating an authentication iris image using the encoded iris images registered in the device.

Referring to FIG. 1, in operation 105, an authentication apparatus or processor obtains iris images from a user. For example, the authentication apparatus obtains the iris images using an infrared ray (IR) sensor. The iris images are photographed, infrared scanned, or sensed by the authentication apparatus or may be photographed, infrared scanned, or received at a separate photographing device.

In operation 110, the authentication apparatus measures a quality qi of the iris images obtained in operation 105. For example, the authentication apparatus measures the quality qi of the iris images photographed, infrared scanned, or sensed based on an absolute area of an iris region in the iris images, a relative size (effective area) of the iris region compared to an entire area of the iris images, a contrast between an iris and a pupil (or sclera), and/or whether a blur is present. The authentication apparatus selects and encodes iris image(s) that have a quality greater than or equal to a predetermined level, among the iris images, based on a quality measurement.

In operation 115, the authentication apparatus compares the quality $q_1$ of the iris images to a preset threshold $q_{th,1}$. In response to the quality $q_1$ of the iris images being less than the preset threshold $q_{th,1}$, the authentication apparatus terminates an operation and prevents the user to access the device or returns to operation 105 and transmits a notification through the device requesting new iris images.

In operation 120, the authentication apparatus generates iris codes and mask codes corresponding to the iris images using the iris images in response to the quality $q_1$ of the iris images being greater than or equal to the preset threshold $q_{th,1}$.

An authentication performance and an authentication rate of the authentication apparatus are closely related to quality of enrolled images. The quality of images may vary depending on an environment in which the images are photographed. In an example, the authentication performance and the authentication rate are enhanced by constituting an enroll set using images that pass an image quality test.

In operation 125, the authentication apparatus constitutes the enroll set using the iris codes and the mask codes generated in operation 120. The enroll set further includes a synthesized code including a synthesized iris code and a synthesized mask code in addition to the iris codes and the mask codes generated in operation 120. In an example, a new synthesized code other than the enrolled iris code is generated such that the synthesized code is included in the enroll set or used as a representative iris code of the enroll set. An accuracy in a code matching performance is enhanced, and an efficiency in terms of an amount of memory usage and an authentication rate is obtained using the synthesized code generated based on the iris codes enrolled or registered in the enroll set. Detailed description of a method to generate the synthesized code is provided with reference to FIG. 2.

In operation 130, the authentication apparatus receives an authentication iris image. The authentication iris image is photographed, scanned, or sensed by the authentication apparatus, or is photographed, scanned, or received by a separate photographing device.

In operation 135, the authentication apparatus measures a quality $q_2$ of the authentication iris image.

In operation 140, the authentication apparatus compares the quality $q_2$ of the authentication iris image to a preset threshold $q_{th,2}$. In response to the quality $q_2$ of the authentication iris image being less than the preset threshold $q_{th,2}$, the authentication apparatus terminates an operation and prevents the user from accessing the device or newly obtains the authentication iris image in operation 130.

In operation 145, the authentication apparatus generates an authentication iris code and an authentication mask code corresponding to the authentication iris image in response to the quality $q_2$ of the authentication iris image being greater than or equal to the preset threshold $q_{th,2}$.

In operation 150, the authentication apparatus calculates similarities, s, between the authentication iris code and the iris codes included in the enroll set with the authentication mask code and the mask codes, respectively, included in the enroll set. In an example, the authentication apparatus authenticates the authentication iris image based on the similarities, s, between the authentication iris code and the iris codes included in the enroll set, and the similarities, s, between the authentication mask code and the mask codes included in the enroll set. In one example, the authentication apparatus calculates the similarities, s, based on matching scores or Hamming distances between the authentication iris code and the iris codes included in the enroll set, and the matching scores or the Hamming distances between the authentication mask code and the mask codes included in the enroll set. The matching scores indicate that the similarities, s, increase as values of scores increase. The Hamming distances indicate that the similarities, s, increase as distances are short.

In operation 155, the authentication apparatus verifies whether the similarities, s, are greater than or equal to a preset threshold $t_{th}$. Based on a verification that the similarities, s, are greater than or equal to the threshold $t_{th}$, in operation 155, the authentication apparatus determines that the authentication of the authentication iris image to have failed; in other words, user authentication of the authentication iris image to have failed in operation 160. As a result, the user would not be able to access the data in the device or use the device. The user would need to re-submit the iris images to the authentication apparatus to try to gain access to the device.

Based on the verification that the similarities, s, are greater than or equal to the threshold $t_{th}$, in operation 155, the authentication apparatus determines the authentication of the authentication iris image to be successful, that is, the user authentication of the authentication iris image to be successful in operation 165 and the user is allowed to access or use the device.

Figure 2:
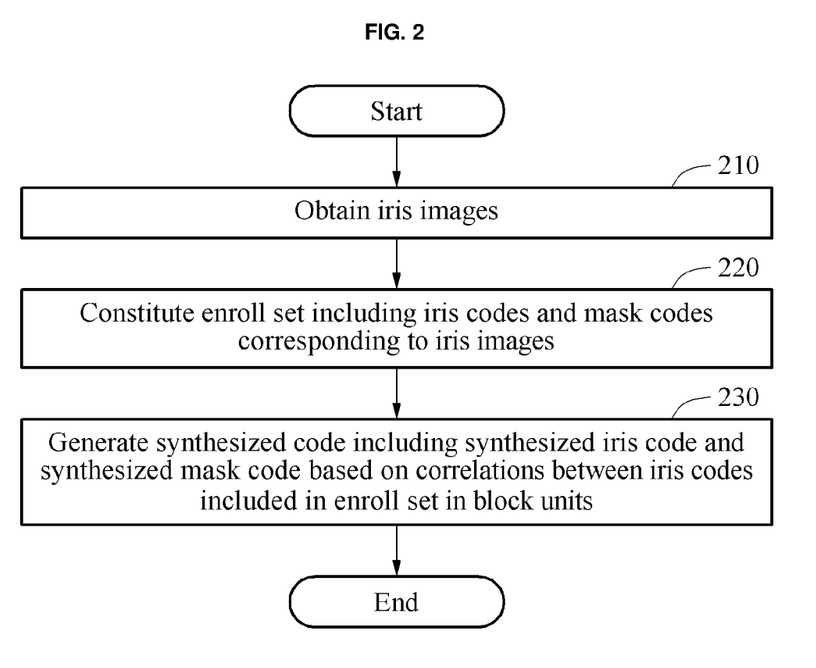
FIG. 2 is a flowchart illustrating an example of a method to generate a synthesized code.

FIG. 2 is a flowchart illustrating an example of a method to generate a synthesized code. Referring to FIG. 2, in operation 210, an authentication apparatus obtains iris images. In an example, the authentication apparatus photographs or infrared scans an iris image of one frame. A plurality of iris images may be included in the iris image of one frame. In another example, the iris images are obtained from a plurality of static iris images or a video. The authentication apparatus obtains the iris images using, for example, a mobile device. The authentication apparatus may be a mobile device itself or a processor included in the mobile device.

In operation 220, the authentication apparatus constitutes an enroll set including iris codes and mask codes corresponding to the iris images. The authentication apparatus constitutes the enroll set with the iris codes and the mask codes generated using iris images having a quality greater than or equal to a preset threshold, as described above. An example of a configuration of the enroll set, the iris codes, and the mask codes generated in response to the iris images is illustrated in FIG. 3.

In operation 230, the authentication apparatus generates, in block units, a synthesized code including a synthesized iris code and a synthesized mask code based on correlations between the iris codes included in the enroll set. Detailed description of a method by which the authentication apparatus generates the synthesized code is provided with reference to FIG. 4.

Figure 3:
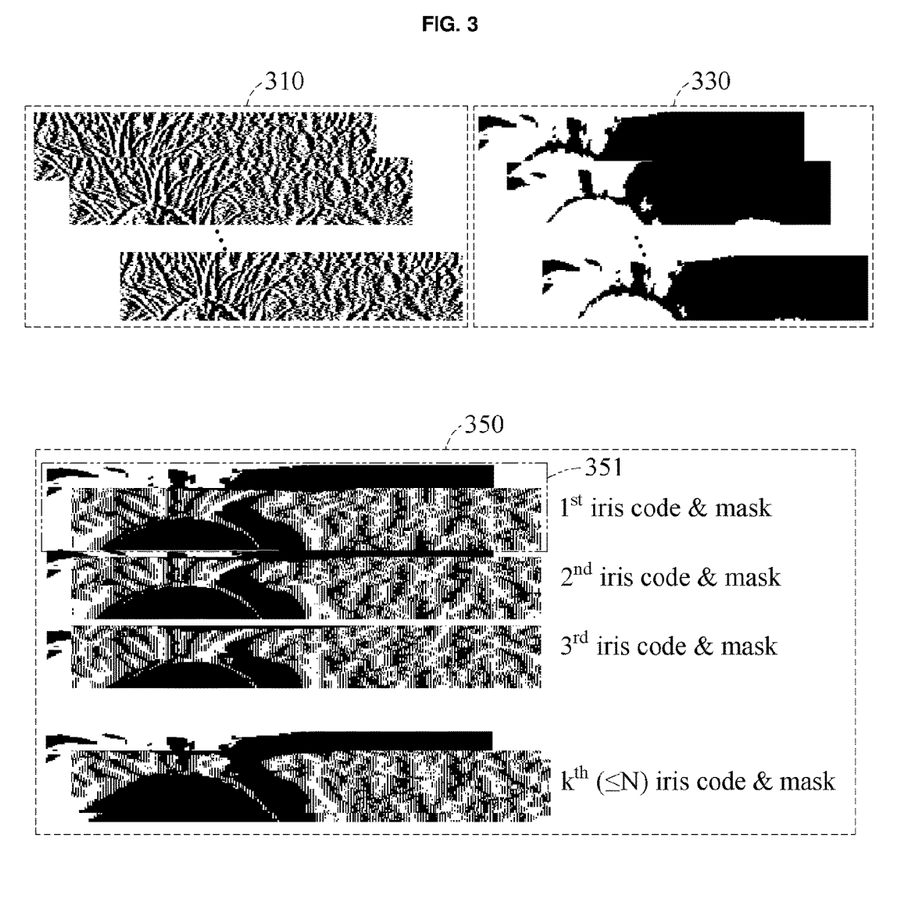
FIG. 3 illustrates an example of iris codes, mask codes, and an enroll set.

FIG. 3 illustrates an example of iris codes, mask codes, and an enroll set. FIG. 3 illustrates an iris code(s) 310, a mask code(s) 330 generated corresponding to iris images, and an enroll set 350. A mask code may be generated by reading a value of an image pixel per pixel same as like a template code. The mask code uses a pre-processed image and a position of Gabor filters, such as 2D Gabor filters, in order to define which bits are extracted from iris texture and which correspond to noisy data including, but not limited to, eyelids, eyelashes, and/or spot reflections.

When matching scores or Hamming distances are calculated for iris authentication by calculating similarities in operation 150 of FIG. 1, a portion in which a mask code(s) corresponding to each iris code(s) is represented as black may be used other than using every pixel of the iris code(s). A process in which an authentication apparatus generates the iris code(s) is as follows.

A form or shape of an iris pattern of an iris region detected from iris images is maintained by a motion of contraction or expansion of a pupil, but a size of the iris pattern may be changed. The authentication apparatus performs normalization such that an iris image is not changed by contraction or expansion of the pupil. For example, the authentication apparatus performs polar coordinate conversion through sampling in a radial direction and an angular direction based on a center of an iris. An iris image on which the polar coordinate conversion is performed is normalized in a rectangular shape, for instance, irrespective of the contraction or expansion of the pupil such that an inside of the iris image has a predetermined pattern.

The authentication apparatus encodes the normalized iris image to extract a pattern from the normalized iris image. For example, the authentication apparatus encodes the normalized iris image by applying a Gabor wavelet transform that represents position information and frequency information to the corresponding iris image.

After the Gabor wavelet transform is applied, the authentication apparatus generates the iris code 310 by classifying the normalized iris image and allocating a binary code in response to phase information corresponding to which portion of a complex coordinate quadrant. The authentication apparatus generates the iris code 310 by classifying the normalized image based on, for example, two bits of '00', '01', '10', and '11' and allocating the binary code. The authentication apparatus generates the iris code 310 by performing the above-described operation on every iris image having a quality greater than or equal to a preset threshold.

In addition, the authentication apparatus searches for an occlusion region, in which an iris is occluded by an eyelid or an eyelash from the iris image normalized in the above-described iris code generating process, based on a segmentation scheme or a curve-fitting scheme. Thus, the authentication apparatus generates the mask code 330 using the occlusion region. As previously indicated, the mask code 330 includes regions that are not to be included in the iris code. The authentication apparatus generates the mask code 330 corresponding to the iris code 310 by performing the above-described operation on every iris image having the quality greater than or equal to the preset threshold. A size of the iris code 310 and a size of the mask code 330 is determined based on a sampling interval. For example, the iris code 310 and the mask code 330 include a size of 360 pixels (horizontal)×64 pixels (vertical).

The authentication apparatus generates masked iris codes 351 by reflecting a first mask code corresponding to a first iris code, with respect to the first iris code, and reflecting a second mask code corresponding to a second iris code, with respect to the second iris code. The authentication apparatus constitutes the enroll set 350 by the masked iris codes 351 generated by reflecting the mask code 330 corresponding to the iris code 310 with respect to the iris code 310.

As described above, a number of iris images of which a quality exceeds a reference value is insufficient due to various reasons, for example, shaking of a user and an illumination environment in which an iris image is obtained. The insufficient number of iris images may cause a significant decrease in a recognition performance.

In an example, to enhance the recognition performance, a number of iris codes included in an enroll set may increase by newly generating a synthesized code using iris codes and mask codes included in the enroll set. In addition, the recognition performance is enhanced by reducing an influence of a block having a relatively small correlation with other blocks. In particular, to enhance the recognition performance, an influence of a block having a relatively high probability that such block is a fragile bit is reduced using the iris codes included in the enroll set. Also, in an example, the authentication apparatus reduces an amount of memory usage through code lightening using the synthesized code instead of the enroll set when performing matching for authentication. The authentication apparatus enhances an authentication rate by decreasing a redundant amount of score calculation when comparing is performed for authentication.

Figure 4:
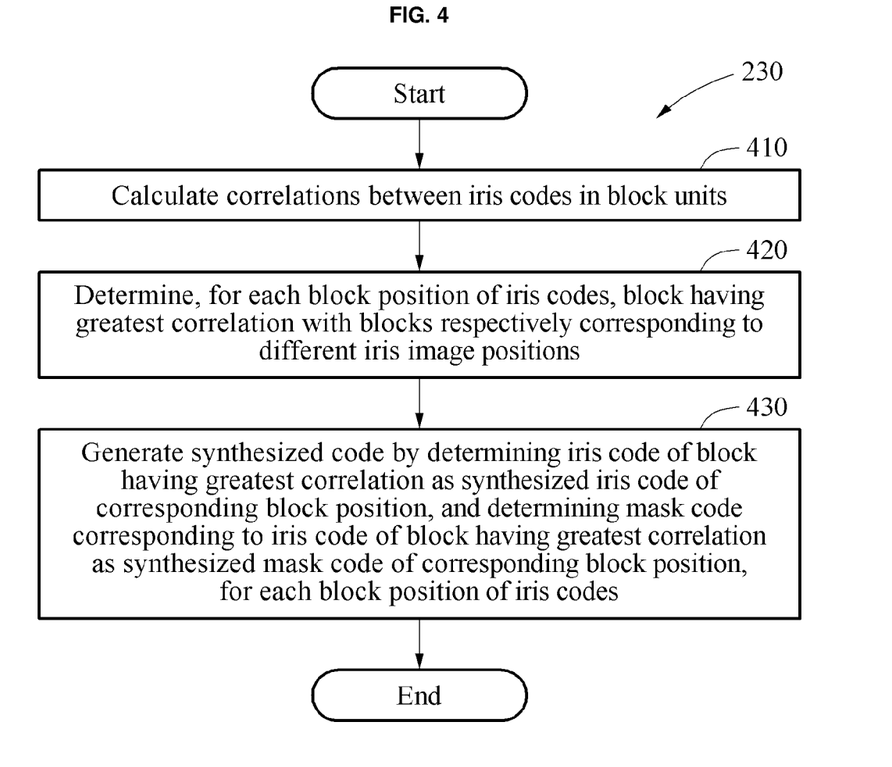
FIG. 4 is a flowchart illustrating an example of a method to generate a synthesized code based on correlations in block units.

FIG. 4 is a flowchart illustrating an example of a method to generate a synthesized code based on correlations in block units. Referring to FIG. 4, in operation 410, an authentication apparatus calculates correlations between iris codes in block units. The authentication apparatus generates a synthesized code by determining, for each block position of the iris codes, a synthesized iris code and a synthesized mask code based on the correlations with blocks respectively corresponding to different iris image positions. Detailed description of a method by which the authentication apparatus calculates the correlations in the block units is provided with reference to FIGS. 5 and 6.

In operation 420, the authentication apparatus determines, for each block position of the iris codes, a block having a greatest correlation with the blocks that respectively correspond to the different iris image positions. For example, the authentication apparatus determines a block having a greatest correlation based on a total sum of correlations with blocks respectively corresponding to different iris image positions.

In operation 430, the authentication apparatus generates the synthesized code by determining an iris code of the block having the greatest correlation as the synthesized iris code of the corresponding block position, and determining a mask code corresponding to the iris code of the block having the greatest correlation as the synthesized mask code of the corresponding block position.

In an example, the authentication apparatus generates the synthesized code using a block having a second greatest correlation by determining, for each block position of the iris codes, the block having the second greatest correlation with the blocks that respectively correspond to different iris image positions. The authentication apparatus generates the synthesized code by determining, for each block position, an iris code of the block having the second greatest correlation as the synthesized iris code of the corresponding block position and by determining, for each block position, a mask code corresponding to the iris code of the block having the second greatest correlation as the synthesized mask code of the corresponding block position.

Figure 5:
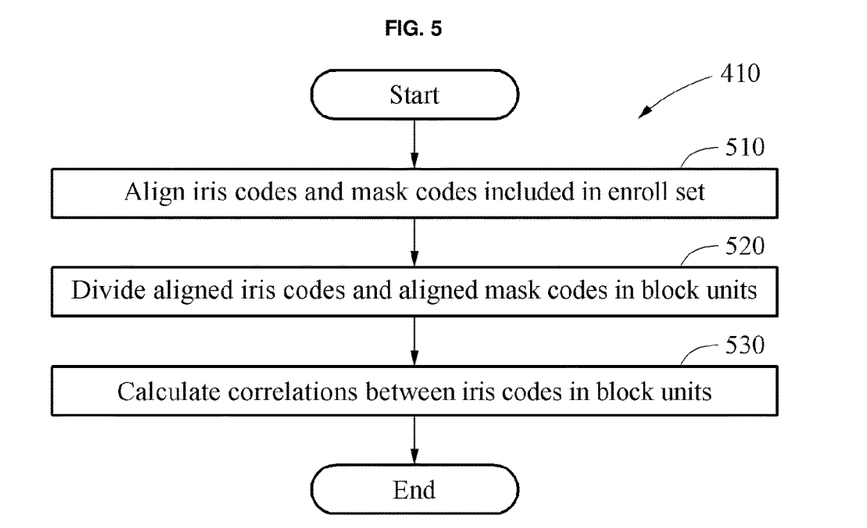
FIG. 5 is a flowchart illustrating an example of a method to calculate correlations.

FIG. 5 is a flowchart illustrating an example of a method to calculate correlations. Referring to FIG. 5, in operation 510, an authentication apparatus aligns iris codes and mask codes included in an enroll set. In an example, an iris image is obtained from a face image captured while a user face is turned left by about 15 degrees from a reference position, for example, a front. In this example, the iris image is distorted at a predetermined angle compared to an iris image obtained from a front face. Thus, through alignment, the authentication apparatus adjusts an angle variation of the iris codes caused because the iris images are captured at different angles.

In operation 510, the authentication apparatus searches for a point at which similarities between the iris codes are maximized by horizontally shifting the iris codes included in the enroll set. The authentication apparatus aligns the iris codes and the mask codes corresponding to the iris codes based on the point at which the similarities between the iris codes are maximized. Based on such an alignment process, the iris codes and the mask codes corresponding to an identical portion of an iris are aligned at identical positions.

In operation 520, the authentication apparatus divides the aligned iris codes and the aligned mask codes in block units. For example, the authentication apparatus divides the aligned iris codes and the aligned mask codes in block units of 9 pixels×9 pixels. In one example, the block units are different from each other (not overlapping) or partially overlap.

In operation 530, the authentication apparatus calculates correlations between the iris codes in the block units. The authentication apparatus may calculate the correlations between blocks at respective identical positions of the iris codes. Detailed description of a method by which the authentication apparatus calculates the correlations in the block units is provided with reference to FIG. 6.

Figure 6:
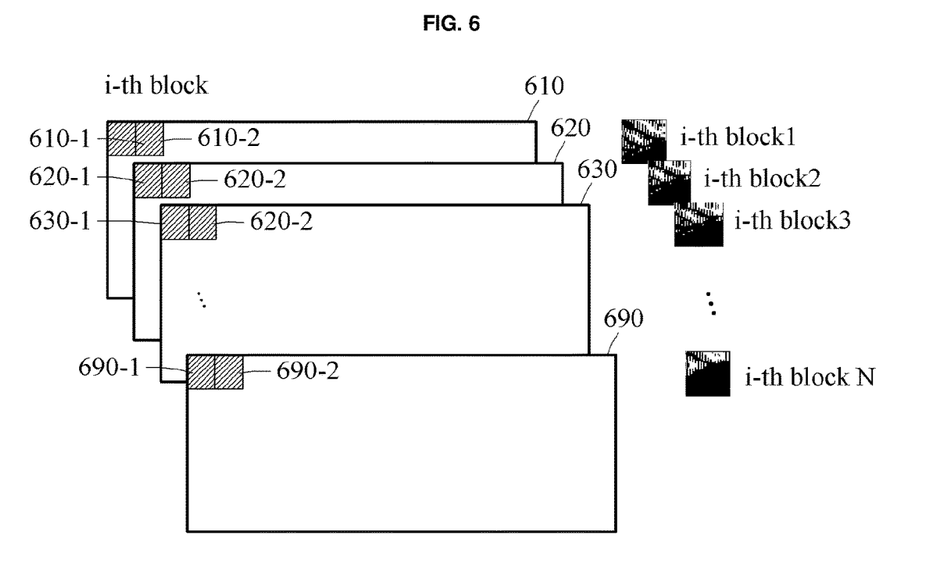
FIG. 6 illustrates an example of a method to calculate correlations in block units.

FIG. 6 illustrates an example of a method to calculate correlations in block units. FIG. 6 illustrates iris codes 610, 620, 630, . . . , 690, blocks 610-1, 620-1, . . . , 690-1 at respective first positions of the iris codes 610, 620, 630, . . . , 690, and blocks 610-2, 620-2, . . . , 690-2 at respective second positions of the iris codes 610, 620, 630, . . . , 690.

An authentication apparatus calculates the correlations between blocks at respective identical positions of iris codes. For example, the authentication apparatus calculates correlations between the blocks 610-1, 620-1, 630-1, . . . , 690-1 at respective first positions of the iris codes 610, 620, 630, . . . , 690. In more detail, the authentication apparatus may calculate the correlations between the blocks at the respective identical positions, for example, correlations between the block 610-1 and the remaining blocks 620-1, 630-1, . . . , 690-1, correlations between the block 620-1 and the remaining blocks 610-1, 630-1, . . . , 690-1, and correlations between the block 630-1 and the remaining blocks 610-1, 620-1, . . . , 690-1.

The authentication apparatus determines an iris code (of a block) having a greatest correlation based on a sum of the correlations between the blocks. For example, a total sum of the correlations between the block 620-1 at the first position of the second iris code 620 and the remaining the blocks 610-1, 630-1, . . . , 690-1 at the respective first positions of the iris codes may be considered to be greatest. The authentication apparatus determines the iris code of the block 620-1 at the first position of the second iris code 620 as a corresponding block position, that is, a synthesized iris code at the first position.

In addition, the authentication apparatus determines a mask code at the first position of a second mask code corresponding to the second iris code 620 having the greatest correlation as a synthesized mask code.

Also, the authentication apparatus determines the synthesized code and the synthesized mask code corresponding to the block 610-2 at the second position by calculating correlations between the block 610-2 at the second position of the first iris code 610 and the blocks 620-2, 630-2, . . . , 690-2 at respective second positions of the remaining iris codes 620, 630, . . . , 690. The authentication apparatus finally generates the synthesized code by determining the synthesized iris code and the synthesized mask code for each block position based on the above-described method.

In an example, the authentication apparatus generates a newly synthesized biometric code by synthesizing various pre-stored biometric codes in block units in addition to iris codes based on the above-described method, and uses the synthesized biometric code for biometric authentication.

Figure 7:
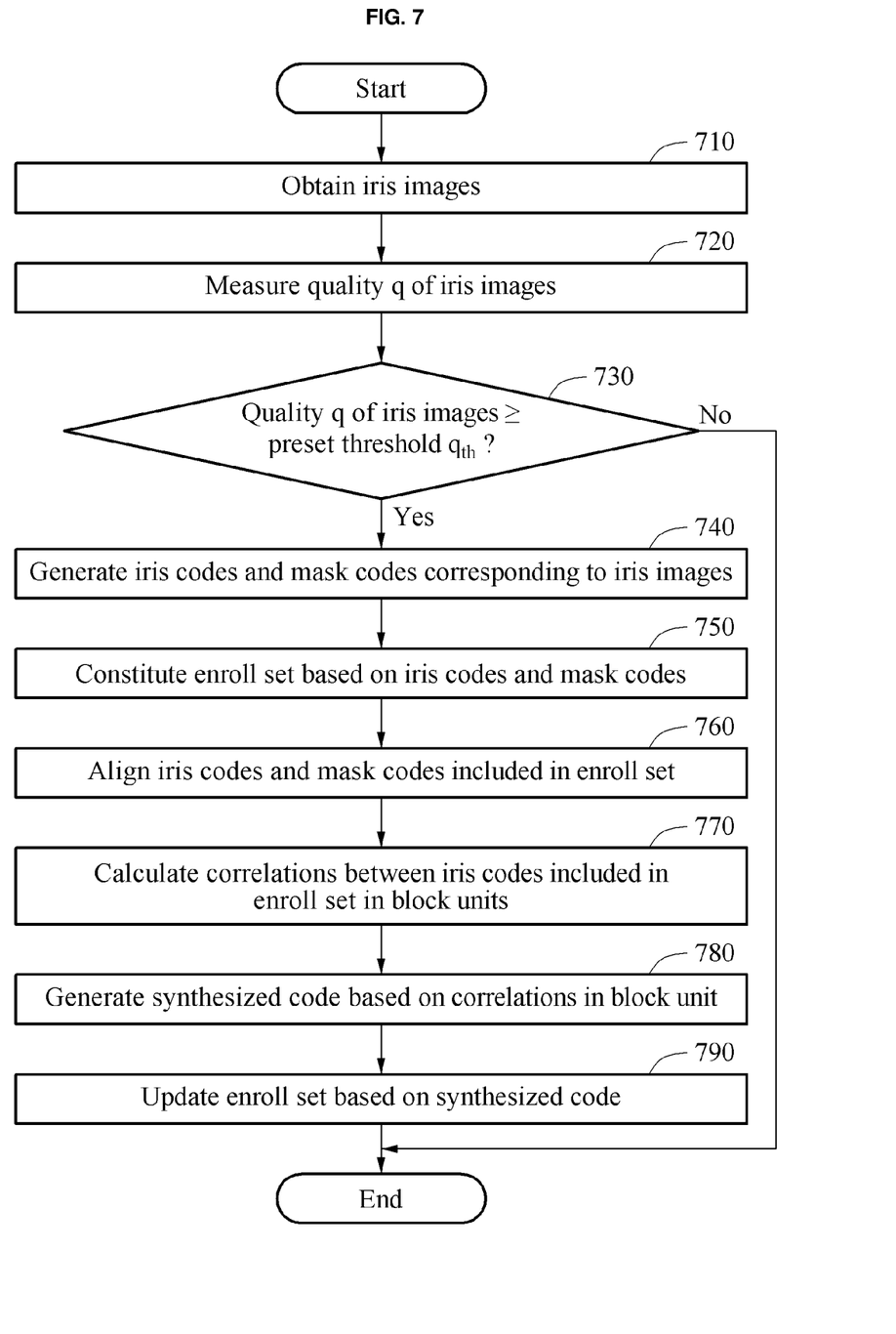
FIGS. 7 and 8 are flowcharts illustrating examples of a method to update an enroll set.

FIG. 7 is a flowchart illustrating an example of a method to update an enroll set. Referring to FIG. 7, in operation 710, an authentication apparatus obtains iris images. At operation 720, the authentication apparatus measures a quality q of the iris images. In operation 730, the authentication apparatus compares the quality q of the iris images to a preset threshold $q_{th}$. In response to the quality q of the iris images being less than the preset threshold $q_{th}$, the authentication apparatus terminates an operation and prevents the user from accessing the device or returns to operation 710 and newly obtains the iris images.

In operation 740, the authentication apparatus generates iris codes and mask codes corresponding to the iris images using the iris images in response to the quality q of the iris images being greater than or equal to the preset threshold $q_{th}$.

In operation 750, the authentication apparatus constitutes an enroll set based on the iris codes and the mask codes generated in operation 740.

In operation 760, the authentication apparatus aligns the iris codes and the mask codes included in the enroll set.

In operation 770, the authentication apparatus calculates correlations between the iris codes included in the enroll set in block units. In operation 780, the authentication apparatus generates a synthesized code based on the correlations in block units.

In operation 790, the authentication apparatus updates the enroll set based on the synthesized code. For example, the authentication apparatus adds the synthesized code to the enroll set or replaces the synthesized code with any one of the iris codes and the mask codes, that is, masked iris codes, included in the enroll set.

Figure 8:
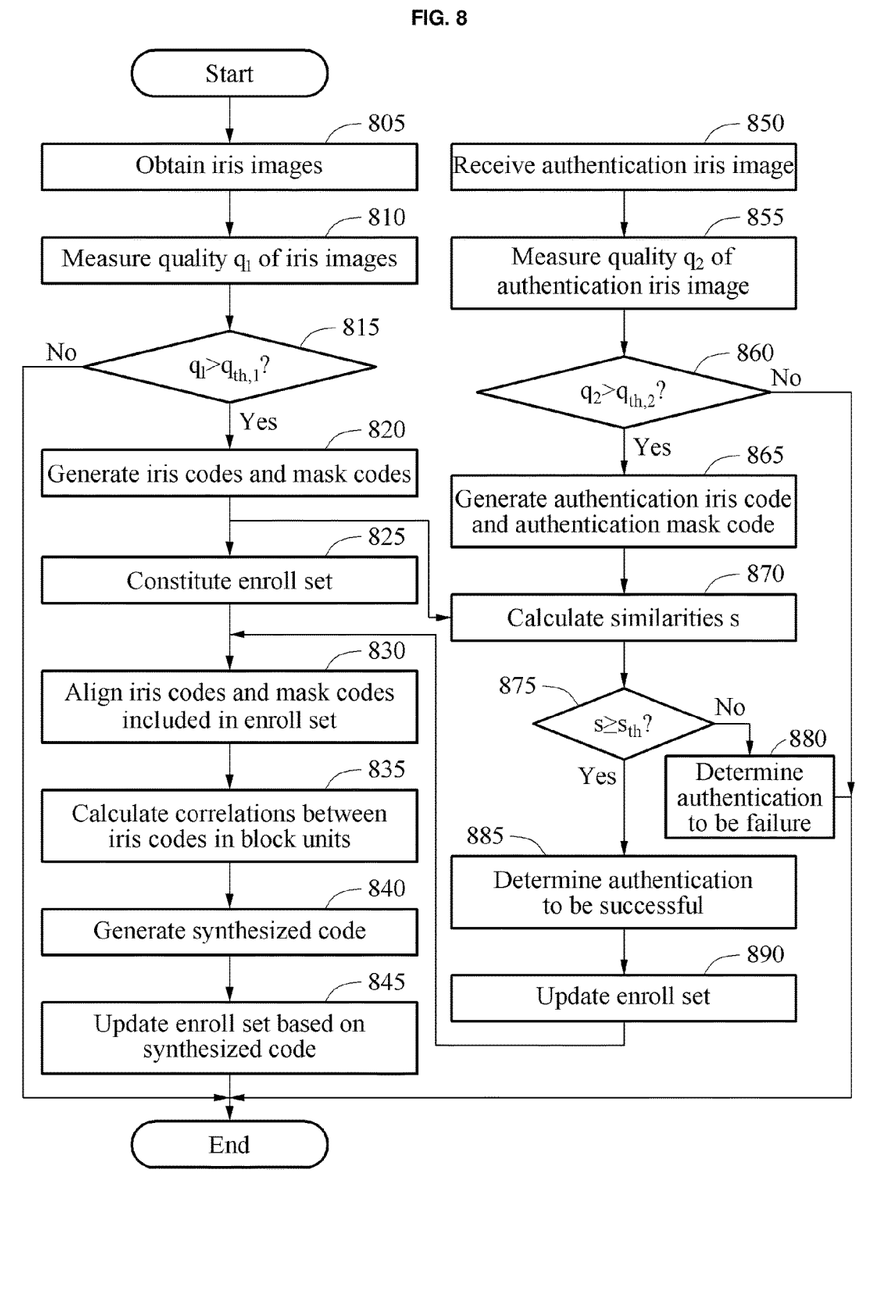

FIG. 8 is a flowchart illustrating another example of a method to update an enroll set. Referring to FIG. 8, the descriptions of operations 805 through 845 are applicable to operations 710 through 790, and operations 850 through 885 are applicable to operations 130 through 165 and thus, duplicated descriptions will be omitted for conciseness.

An authentication apparatus updates an enroll set by an authentication iris code and an authentication mask code based on similarities, s, calculated in operation 870. In operation 890, the authentication apparatus updates the enroll set by the authentication iris code and the authentication mask code with respect to which authentication succeeds. The authentication apparatus adds the authentication iris code and the authentication mask code based on which authentication succeeds to the enroll set or replaces the authentication iris code and the authentication mask code based on which authentication succeeds with any one of the iris codes and the mask codes included in the enroll set.

In operation 830, in response to the enroll set being updated, the authentication apparatus aligns all iris codes and all mask codes included in the updated enroll set in operation 830, and calculates correlations between all iris codes in block units. In an example, all iris codes include the authentication iris code and the iris codes in the enroll set, and all mask codes include the added authentication mask code(s) and the authentication mask codes in the enroll set.

In operation 840, the authentication apparatus generates a synthesized code by determining, for each block position of all iris codes, the synthesized iris code and the synthesized mask code based on the correlations with blocks that respectively correspond to different iris image positions. In operation 845, the authentication apparatus updates the enroll set based on the synthesized code generated by all iris codes in operation 840.

Figure 9:
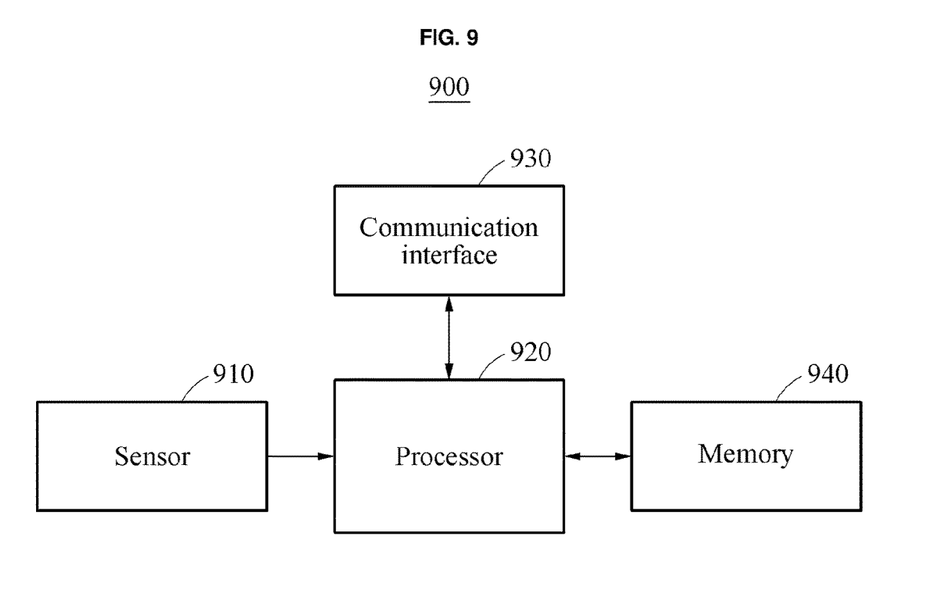
FIG. 9 is a flowchart illustrating an example of an authentication apparatus.

FIG. 9 is a flowchart illustrating an example of an authentication apparatus. Referring to FIG. 9, an authentication apparatus 900 includes a sensor 910 and a processor 920. The authentication apparatus 900 further includes a communication interface 930 and a memory 940.

The sensor 910 photographs iris images. The sensor 910 includes an infrared ray (IR) sensor.

The processor 920 constitutes an enroll set including iris codes and mask codes corresponding to the iris images. The processor 920 generates a synthesized code including a synthesized iris code and a synthesized mask code based on correlations between the iris codes included in the enroll set in block units.

The processor 920 calculates the correlations between the iris codes in the block units. The processor 920 generates the synthesized code by determining, for each block position of the iris codes, the synthesized iris code and the synthesized mask code based on the correlations between blocks that respectively correspond to different iris image positions.

The processor 920 determines, for each block position of the iris codes, a block having a greatest correlation with the blocks that respectively corresponds to the different iris image positions. The processor 920 determines an iris code of the block having the greatest correlation as the synthesized iris code of the corresponding block position. Also, the processor 920 generates the synthesized code by determining a mask code corresponding to the iris code of the block having the greatest correlation as the synthesized mask code of the corresponding block position.

The processor 920 aligns the iris codes and the mask codes included in the enroll set, and divides the aligned iris codes and the aligned mask codes in the block units. The processor 920 updates the enroll set based on the synthesized code.

In addition, the processor 920 performs or executes at least one of above-described methods provided with reference to FIGS. 1 through 8 or a process corresponding to the at least one of above-described methods. The processor 920 executes a program and controls the authentication apparatus 900. A program code executed by the processor 920 is stored in the memory 940. The authentication apparatus 900 is connected to an external device, for example, a personal computer (PC), or a network through an input and output device (not shown), thereby performing a data exchange. The authentication apparatus 900 includes various electronic systems, for example, a smart television, a smartphone, and a smart vehicle.

The communication interface 930 receives an authentication iris image. The processor 920 generates an authentication iris code and an authentication mask code corresponding to the authentication iris image. The processor 920 authenticates the authenticate iris image based on similarities between the authentication iris code and the iris codes included in the enroll set, and similarities between the authentication mask code and the mask codes included in the enroll set.

The memory 940 stores the enroll set including the iris codes and the mask codes corresponding to the iris images, and the updated enroll set. In addition, the memory 940 stores the iris images and the synthesized code. The memory 940 may be a volatile memory or a non-volatile memory.

The authentication apparatus 900 in FIG. 9 that performs the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 2, 4, 5, and 7-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An authentication method, comprising:
    obtaining iris images;
    constituting an enroll set including iris codes and mask codes corresponding to the iris images; and
    generating a synthesized code including a synthesized iris code and a synthesized mask code based on correlations between the iris codes included in the enroll set in block units;
    wherein the generating of the synthesized code comprises:
    calculating the correlations between the iris codes in the block units; and
    determining, for each block position of the iris codes, the synthesized iris code and the synthesized mask code based on correlations with blocks that respectively correspond to different iris image positions.

2. The method of claim 1, wherein the generating of the synthesized code comprises:
    determining, for each block position of the iris codes, a block having a greatest correlation with the blocks that respectively correspond to the different iris image positions; and
    for each block position of the iris codes, determining an iris code of the block having the greatest correlation as a synthesized iris code of the corresponding block position, and determining a mask code corresponding to the iris code of the block having the greatest correlation as a synthesized mask code of the corresponding block position.

3. The method of claim 1, wherein the generating of the synthesized code comprises:
determining, for each block position of the iris codes, a block having a second greatest correlation with the blocks that respectively correspond to different iris image positions; and
for each block position of the iris codes, determining an iris code of the block having the second greatest correlation as a synthesized iris code of the corresponding block, and determining a mask code corresponding to the iris code of the block having the second greatest correlation as a synthesized mask code of the corresponding block.

4. The method of claim 1, wherein the calculating of the correlations in the block units comprises calculating correlations between blocks at respective identical positions of the iris codes.

5. The method of claim 1, wherein the calculating of the correlations in the block units comprises:
aligning the iris codes and the mask codes included in the enroll set; and
dividing the aligned iris codes and the aligned mask codes in the block units.

6. The method of claim 1, wherein the block units are different from each other or partially overlap.

7. The method of claim 1, further comprising:
updating the enroll set based on the synthesized code.

8. The method of claim 7, wherein the updating of the enroll set comprises:
adding the synthesized code to the enroll set; and
replacing the synthesized code with any one of the iris codes and the mask codes included in the enroll set.

9. The method of claim 1, further comprising:
generating an authentication iris code and an authentication mask code corresponding to an authentication iris image; and
authenticating the authentication iris image based on similarities between the authentication iris code and the iris codes included in the enroll set, and similarities between the authentication mask code and the mask codes included in the enroll set.

10. The method of claim 9, further comprising:
updating the enroll set by the authentication iris code and the authentication mask code based on the similarities.

11. The method of claim 10, wherein the updating comprises:
adding the authentication iris code and the authentication mask code to the enroll set;
aligning all of the iris codes and all of the mask codes included in the enroll set to which the authentication iris code and the authentication mask code are added;
calculating correlations between all of the iris codes in block units; and
generating the synthesized code by determining, for each block position of all the iris codes, the synthesized code and the synthesized mask code based on correlations with blocks that respectively correspond to different iris image positions.

12. The method of claim 1, wherein the constituting of the enroll set comprises:
generating the iris codes and the mask codes corresponding to the iris images using iris images having a measured quality greater than or equal to a threshold; and
constituting the enroll set using the iris codes and the mask codes.

13. The method of claim 1, wherein the obtaining comprises:
obtaining the iris images using a mobile device.

14. A non-transitory computer-readable storage medium storing instructions that, when executed by a processor, cause the processor to perform the method of claim 1.

15. An authentication apparatus, comprising:
a sensor configured to photograph iris images; and
a processor configured to constitute an enroll set including iris codes and mask codes corresponding to the iris images, and generate a synthesized code including a synthesized iris code and a synthesized mask code based on correlations between the iris codes included in the enroll set in block units; wherein the processor is configured to calculate the correlations between the iris codes in the block units, and generate the synthesized code by determining, for each block position of the iris codes, the synthesized iris code and the synthesized mask code based on correlations with blocks that respectively correspond to different iris image positions.

16. The authentication apparatus of claim 7, wherein the processor is configured to generate the synthesized code by
determining, for each block position of the iris codes, a block having a greatest correlation with the blocks that respectively correspond to the different iris image positions,
determining, for each block position of the iris codes, an iris code of the block having the greatest correlation, and
determining a mask code corresponding to the iris code of the block having the greatest correlation as a synthesized mask code of the corresponding block position.

17. The authentication apparatus of claim 15, wherein the processor is configured to align the iris codes and the mask codes included in the enroll set, and divide the aligned iris codes and the aligned mask codes in the block units.

18. The authentication apparatus of claim 15, wherein the processor is configured to update the enroll set based on the synthesized code.

19. The authentication apparatus of claim 15, further comprising:
a communication interface configured to receive an authentication iris image,
wherein the processor is configured to generate an authentication iris code and an authentication mask code corresponding to the authentication iris image, and authenticate the authentication iris image based on similarities between the authentication iris code and the iris codes included in the enroll set, and similarities between the authentication mask code and the mask codes included in the enroll set.

* * * * *